United States Patent
Paul et al.

(10) Patent No.: US 6,715,021 B1
(45) Date of Patent: Mar. 30, 2004

(54) OUT-OF-BAND LOOK-AHEAD ARBITRATION METHOD AND/OR ARCHITECTURE

(75) Inventors: Somnath Paul, Milpitas, CA (US); S. Babar Raza, Milpitas, CA (US)

(73) Assignee: Cypress Semiconductor Corp., San Jose, CA (US)

(*) Notice: Subject to any disclaimer, the term of this patent is extended or adjusted under 35 U.S.C. 154(b) by 475 days.

(21) Appl. No.: 09/732,687

(22) Filed: Dec. 8, 2000

(51) Int. Cl.[7] .............................................. G06F 13/00
(52) U.S. Cl. ...................................... 710/310; 710/309
(58) Field of Search ................................. 710/107, 305, 710/306, 313, 310, 315, 309; 711/154

(56) References Cited

U.S. PATENT DOCUMENTS

| | | | | |
|---|---|---|---|---|
| 5,649,230 A | * | 7/1997 | Lentz | 710/52 |
| 5,963,499 A | * | 10/1999 | Leong et al. | 365/230.03 |
| 6,526,495 B1 | * | 2/2003 | Sevalia et al. | 711/173 |

OTHER PUBLICATIONS

S. Babar Raza et al., "Architecture for Implementing Virtual Multiqueue FIFOS", Ser. No. 09/676,704, Filed: Sep. 29, 2000.

S. Babar Raza et al., "Method and Logic for Storing and Extracting In–Band Multicast Port Information Stored Along with the Data in a Single Memory Without Memory Read Cycle Overhead", Ser. No. 09/676,171, Filed: Sep. 29, 2000.

S. Babar Raza et al., "Logic for Generating Multicast/Unicast Address (ES)", Ser. No. 09/676,706, Filed: Sep. 29, 2000.

S. Babar Raza et al., "Logic for Initializing the Depth of the Queue Pointer Memory", Ser. No. 09/676,705, Filed: Sep. 29, 2000.

S. Babar Raza et al., "Method and Logic for Initializing the Forward–Pointer Memory During Normal Operation of the Device as a Background Process", Ser. No. 09/676,170, Filed: Sep. 29, 2000.

S. Babar Raza et al., "Method and/or Architecture for Implementing Queue Expansion in Multiqueue Devices", Ser. No. 09/714,441, Filed: Nov. 16, 2000.

Somnath Paul et al., "FIFO Read Interface Protocol", Ser. No. 09/732,686, Filed: Dec. 8, 2000.

Somnath Paul et al., "FIFO Read Interface Protocol", Ser. No. 09/732,685, Filed: Dec. 8, 2000.

S. Babar Raza et al., "Logic for Providing Arbitration for Synchronous Dual–Port Memory", Ser. No. 09/676,169, Filed: Sep. 29, 2000.

Jiann–Cheng Chen et al., "Configurable Fast Clock Detection Logic with Programmable Resolution", Ser. No. 09/775,372, Filed: Feb. 1, 2001.

* cited by examiner

*Primary Examiner*—Glenn A. Auve
(74) *Attorney, Agent, or Firm*—Christopher P. Maiorana, P.C.

(57) ABSTRACT

An apparatus comprising a plurality of storage devices and a scheduler circuit. Each of the plurality of storage devices may be configured to store and present one or more packets of a data stream over one or more first busses operating at a first speed. The scheduler circuit may be configured to determine which of the plurality of storage devices transmits the packets of the data stream. A second bus that may be configured to carry look ahead information and synchronize the plurality of devices. The second bus may operate at a second speed.

20 Claims, 4 Drawing Sheets

OUT-OF-BAND LOOK-AHEAD ARBITRATION METHOD AND/OR ARCHITECTURE

CROSS REFERENCE TO RELATED APPLICATIONS

The present application may relate to application Ser. No. 09/676,704, filed Sep. 29, 2000, Ser. No. 09/676,171, filed Sep. 29, 2000, now U.S. Pat. No. 6,578,118, Ser. No. 676,706, filed Sep. 29, 2000, Ser. No. 09/676,705, filed Sep. 29, 2000, Ser. No. 09/676,170, filed Sep. 29, 2000, now U.S. Pat. No. 6,581,144, Ser. No. 09/676,169, filed Sep. 29, 2000, Ser. No. 09/714,441, filed Nov. 16, 2000, Ser. No. 09/732,685, filed Dec. 8. 2000, and Ser. No. 09/732,686, filed Dec. 8, 2000, which are each hereby incorporated by reference in their entirety.

FIELD OF THE INVENTION

The present invention relates to a method and/or architecture for transferring data bus control between multiple devices generally and, more particularly, to a method and/or architecture for out-of-band look-ahead arbitration for transferring data bus control between multiple devices in a queue expanded mode without a clock cycle penalty.

BACKGROUND OF THE INVENTION

Referring to FIG. 1, a conventional system 10 for implementing multiqueue first-in first-out (FIFO) devices is shown. The system 10 includes a selector section 12, a selector section 14 and a number of memory sections 16a–16n. The memory sections 16a–16n are each implemented as FIFO devices. The conventional system 10 implements each of the FIFOs 16a–16n as an independent physical memory.

The selector section 12 receives data from a write interface and presents the data to one of the memory sections 16a–16n in response to a write select signal WR_SEL. The selector section 12 selects one of the FIFOs 16a–16n based on the signal WR_SEL. The incoming data is then stored into the appropriate FIFO 16a–16n. Similarly, the selector section 14 presents data to a read interface from one of the memory sections 16a–16n in response to a read select signal RD_SEL. The selector section 14 selects one of the FIFOs 16a–16n based on the signal RD_SEL and reads the data from the appropriate FIFO 16a–16n.

SUMMARY OF THE INVENTION

The present invention concerns an apparatus comprising a plurality of storage devices and a scheduler circuit. Each of the plurality of storage devices may be configured to store and present one or more packets of a data stream over one or more first busses operating at a first speed. The scheduler circuit may be configured to determine which of the plurality of storage devices transmits the packets of the data stream. A second bus that may be configured to synchronize the plurality of devices. The second bus may operate at a second speed.

The objects, features and advantages of the present invention include providing a method and/or architecture for out-of-band look-ahead arbitration that may (i) implement an event driven variable stage pipeline system; (ii) operate with a plurality of clocks; (iii) have a minimum block size less than total round-time delay; (iv) implement a system where the devices that can arbitrate in the same order as that of queue address, which may select the devices randomly; (v) be implemented without an external arbiter; (vi) allow proper communication between the devices, where the communication may be a function of the packet size; (vii) change the latency of the packets according to the size of the packet being processed; (viii) handle (a) any packet size and/or (b) back-to-back reads; (ix) be implemented without open-drain pads; and/or (x) be implemented independently of the latency between addressing the queue and retrieving data.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention relates to the reading of packets from a number of multiqueue devices each configured within an expanded queue address. It is desired that all the multiqueue devices behave as if they are a single device, but also be capable of handling a variety of possible queue addresses after a queue expansion mode has been activated. The various multiqueue devices generally arbitrate such that the packets are presented in the same sequence as that of the queue address. Such arbitration is generally required to have a minimal (preferably zero) loss of bandwidth. The present invention provides a method to achieve such arbitration while handling a variety of packet sizes in systems having a plurality of clocks.

Figure 1:
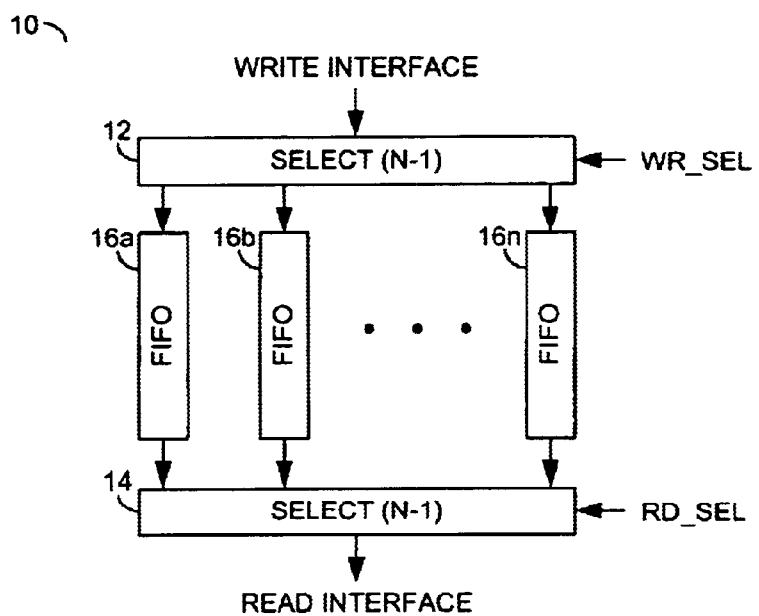
FIG. 1 is a block diagram of a conventional multiqueue FIFO implementation.
Figure 2:
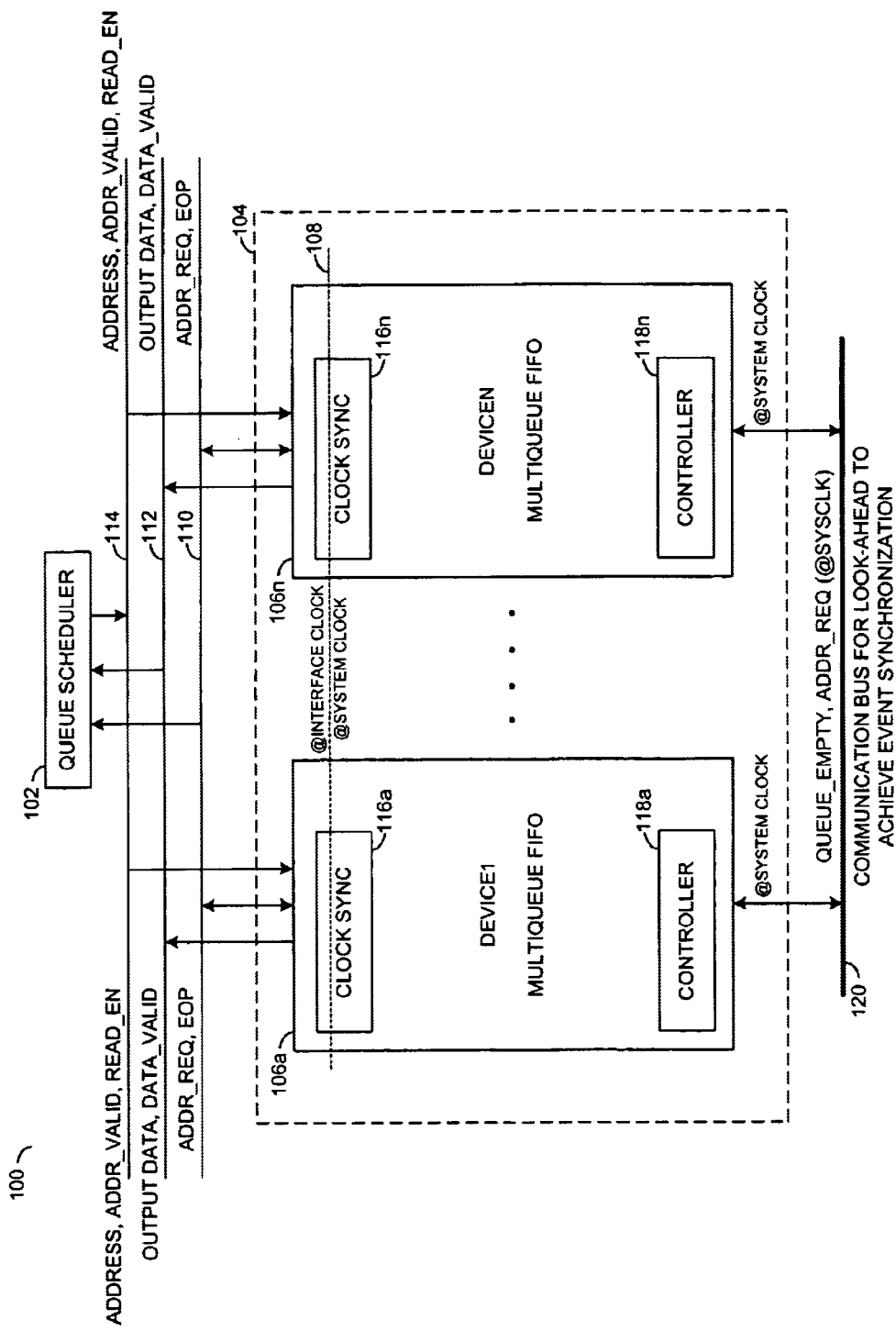
FIG. 2 is a block diagram of a preferred embodiment of the present invention.

Referring to FIG. 2, a block diagram of a system (or circuit) 100 is shown in accordance with a preferred embodiment of the present invention. The circuit 100 may implement an out-of-band look-ahead arbitration method for transferring data bus control between multiple devices while in a queue expanded mode. Additionally, the circuit 100 may implement such control without a clock cycle penalty.

The system 100 generally comprises a queue scheduler 102 and a memory section 104. The queue scheduler 102 may be implemented as a read device. The memory section 104 generally comprises a number of devices 106a–106n. Each of the devices 106a–106n may be implemented as a multiqueue FIFO device. A boundary 108 shows an interface between a portion of the devices 106a–106n that operates in a first clock domain (e.g., timed with a system clock) and a second portion that operates in a second clock domain (e.g., timed with an interface clock). A number of buses 110, 112 and 114 generally connect the queue scheduler 102 to the memory section 104 (including the multiqueue FIFOs 106a–106n). Additionally, each of the devices 106a–106n may comprise a clock synchronization circuit 116 and a control circuit 118.

The bus 110 may transfer address request signals (e.g., ADDR_REQ) and end of packet signals (e.g., EOP) between the queue scheduler 102 and the devices 106a–106n. The bus 112 may transfer valid data signals (e.g., DATA_VALID) and output data (e.g., OUTPUT_

DATA) between the queue scheduler 102 and the devices 106a–106n. The output data OUTPUT_DATA may transfer data packets. The bus 114 may transfer address validation signals (e.g., ADDR_VALID), read enable signals (e.g., READ_EN) and address signals (e.g., ADDRESS) between the queue scheduler 102 and the devices 106a–106n.

The various signals timed with the system clock generally have the notation "@system clock". Similarly, the various signals timed with the interface clock generally have the notation "@interface clock". The buses 110, 112 and 114 are generally timed with the interface clock. A communication bus 120 may also provide additional communication between the devices 106a–106n. The communication bus 120 may be used for look-ahead signals to achieve synchronization. Additionally, the bus 120 is generally timed with the system clock.

The communication bus 120 may transfer queue empty indication signals (e.g., QUEUE_EMPTY) and current packet end indicator signals (e.g., ADDR_REQ (@SYSCLK)). The signals QUEUE_EMPTY and ADDR_REQ(@SYSCLK) may be implemented as indication or control signals that may communicate a status of the devices 106a–106n. In general, all of the devices 106a–106n operate as a single device. The devices 106a–106n are implemented to be capable of handling various possible queue addresses after expansion. The devices 106a–106n may have arbitration, such that the output data packets are presented in the same sequence as that of the queue address, without any loss of bandwidth. The circuit 100 is generally also capable of handling any packet size. The arbitration method of the present invention is described in detail in connection with FIGS. 3 and 4.

If variable size packets are to be handled, a condition may occur when (i) a long packet is about to complete the transfer from one of the devices 106a–106n and (ii) two or more shorter packets on another two or more of the devices 106a–106n are waiting to be transferred. Such a scenario may happen due to the variable latencies between queue addressing and initiating a data read. The variable latency is largely due to different clock speeds of the interface clock and the system clock. The variable latency can also be due to variable size packets. Arbitration of the devices 106a–106n may allow each of the devices 106a–106n to efficiently send data. Such arbitration may ensure that data is sent in the same sequence as received by a particular queue address.

The circuit 100 may achieve such arbitration by ensuring synchronization between all the devices 106a–106n through the communication bus 120. Since all of the devices 106a–106n receive the queue address at the same time and the address will select only one of the devices 106a–106n, the circuit 100 may ensure that the remaining devices 106a–106n wait while packet reads take place. The reads may take place from an internal memory (not shown) within each of the devices 106a–106n. The configuration of the circuit 100 may ease arbitration of the signals on the communication bus 120, which are shared by all the devices 106a–106n.

Since each packet is read and generated once, only a particular device (e.g., 106a) may output signals on the communication bus 120 when performing a FIFO read. Additionally, a single FIFO read may occur without the possibility of multiple writes from the other devices 106b–106n. Also, if the packet read is aborted (e.g., due to a queue empty condition), a corresponding queue address may be simultaneously dropped by all of the devices 106a–106n.

The communication bus 120 may operate at the system clock speed. In one embodiment, the communication bus 120 may be implemented to transmit a signal (e.g., ADDR_REQ(@SYSCLK)) and a status signal (e.g., QUEUE_EMPTY). The signal ADDR_REQ(@SYSCLK) and the signal QUEUE_EMPTY may be I/O signals, wired to all of the remaining devices 106a–106n. The signal ADDR_REQ (@SYSCLK); if active, generally indicates that a packet read is reaching an end. A next packet read may then start for a particular queue address in the device 106a–106n, where the queue address belongs. When the signal QUEUE_EMPTY is active and the signal ADDR_REQ(@SYSCLK) is also active, the signal QUEUE_ADDRESS generally needs to be flushed from the pipeline for all the devices.

Although the signal ADDR_REQ(@INFCLK) may contain end of packet information, the information is not the same as the end-of-packet (EOP) signal available at the read interface pins. In particular, the signal EOP at the read interface pins indicates when the last data of a particular packet is being transferred, even if the data may have actually been read from the internal memory several cycles ahead. The signal ADDR_REQ(@INFCLK) may indicate end of packet information with respect to the data read from the memory 104. However, the signal ADDR_REQ (@INFCLK) may have 2–3 cycles of delay due to clock synchronization. Timing of the signal ADDR_REQ (@INFCLK) and the signal EOP may differ depending on a buffering delay between an interface memory (e.g., the memory section 104) and a read interface (e.g., the data OUTPUT_DATA). The buffering delay may be variable and may depend on packet sizes of consecutive packets and relative clock frequencies. Since clock synchronization may take 2–3 clock cycles, the signal ADDR_REQ(@SYSCLK) may have an advantage of at least 2–3 clock cycles with respect to the signal ADDR_REQ(@INFCLK) available on the read interface pins.

The signal EOP and the signal ADDR_REQ (@INFCLK), in a non-expanded case, are generally only outputs. In an expanded case, the signal ADDR_REQ (@INFCLK) and the signal EOP are implemented as I/O signals. A particular device (e.g., 106a) from which the packet read takes place on the data bus 112 may drive the signal EOP, while the other devices (e.g., 106b–106n) listen to the device 106a and switch at a suitable time. Similarly, the device 106a from which a packet is read from the memory internal to the chip drives the signal ADDR_REQ (@INFCLK) after clock synchronization. For example, the device 106a may drive the signal ADDR_REQ (@INFCLK), while the other devices 106b–106n listen to the device 106a. The data output is wired for all the devices 106a–106n and switching of the bus driver circuits may happen in a similar manner for the signal ADDR_REQ (@SYSCLK)

The communication bus 120 may provide a look-ahead signal for the signal ADDR_REQ(@INFCLK). The look-ahead signal on the bus 120 may be sent with respect to the system clock to the devices 106a–106n. The look-ahead signal may allow reading of packets without any bandwidth loss.

Figure 3:
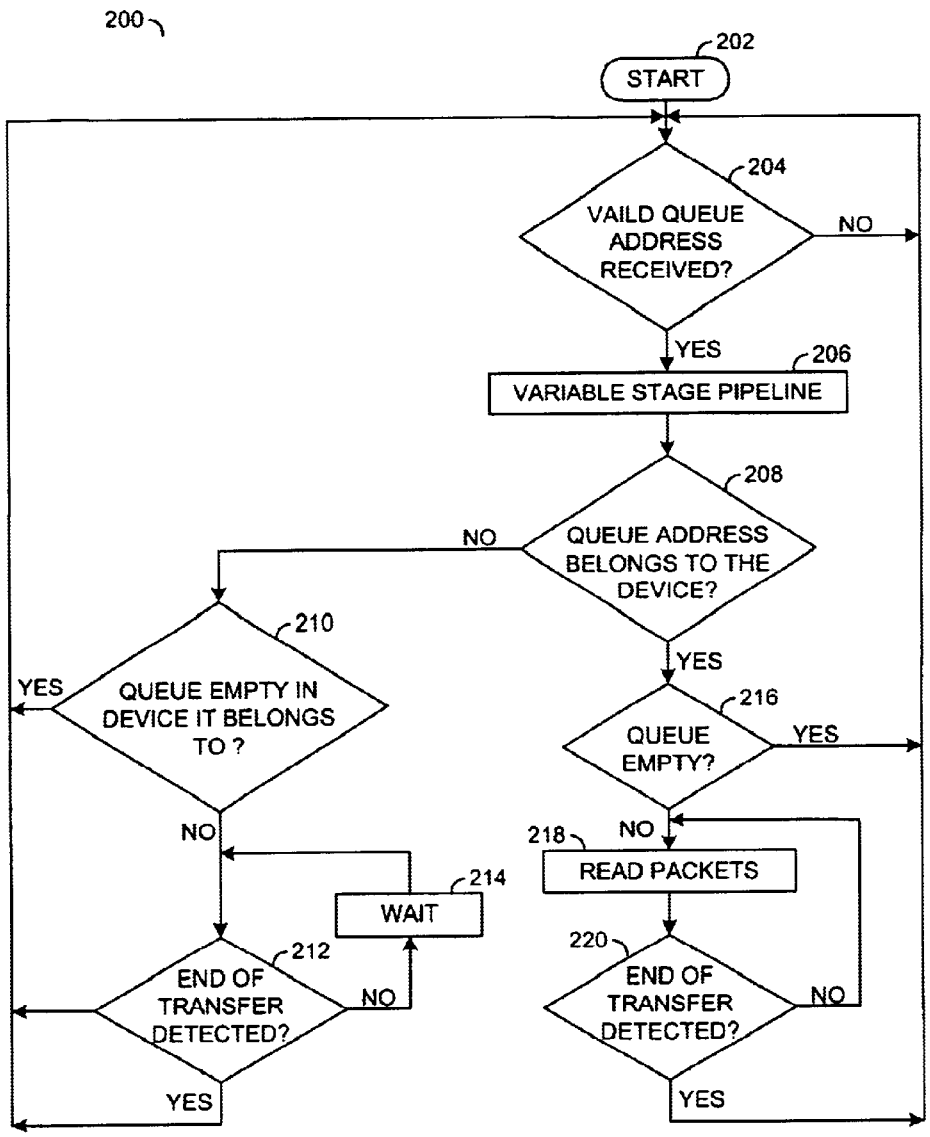
FIG. 3 is a flow diagram illustrating an operation of the present invention.

Referring to FIG. 3, a flow diagram of a system (or method) 200 illustrating how the reading of packets takes place from the devices 106a–106n is shown. The method 200 may illustrate a read occurring on a packet by packet basis. Additionally, the system 200 may illustrate how arbitration is implemented for a multiqueue environment. The method 200 generally begins at a start state 202. A decision state 204 generally determines if a valid queue address has been received. If a valid queue address has not been received, the method 200 continues to loop at the decision state 204. If a valid queue address has been received, a state 206 implements a variable stage pipeline.

A decision state 208 may determine if a queue address belongs to a particular device. If the queue address does not belong to the particular device, the device may enter the decision state 210 which may determine if the selected queue is empty in the addressed device based on the information on the communication bus 120. If so, the method 200 may return to the decision state 204. If not, the decision state 212 may determine if an end of packet has been detected based on the signal EOP. If an end of packet has not been detected, the decision state 212 may continue to loop after a wait state 214. If an end of packet has been detected, the method 200 generally returns to the decision state 204.

Returning to the decision state 208, if a queue address does not belong to the device, a decision state 216 determines if the queue is empty and transmits relevant information on the communication bus 120. If the queue is empty, the method 200 generally returns to the decision state 204. If the queue is not empty, the state 218 generally reads one or more packets from one of the devices 106a–106n. A decision state 220 may determine if an end of packet (or transfer) has been detected. If an end of packet has not been detected, the state 218 may continue to read more data. If an end of packet is detected, the method 200 generally returns to the decision state 204.

Figure 4:
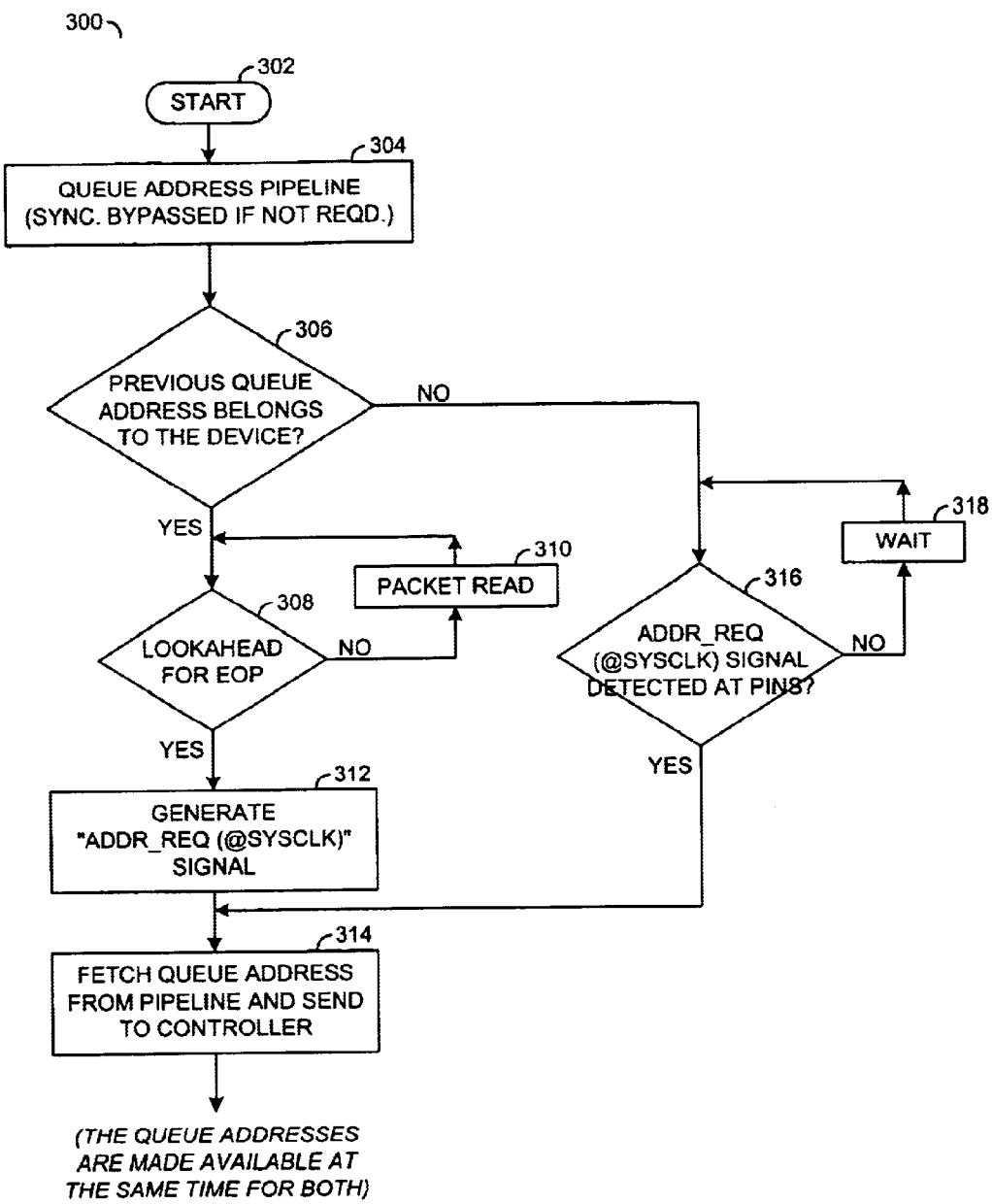
FIG. 4 is a flow diagram illustrating an operation of the present invention.

Referring to FIG. 4, a flow diagram of a process (or method) 300 illustrating how the queue address is synchronously sent to the controllers 118a–118n for the devices 106a–106n is shown. The method 300 may show how synchronization is achieved across the devices 106a–106n for internally fetching the queue address at the same time as a packet read. However, clock synchronization is generally bypassed if not required. A start state 302 generally begins the process 300. A state 304 may provide a queue address in the pipeline. A decision state 306 may determine if a previous queue address belongs to the device. If the previous address does belong to the device, a state 308 may determine if a look-ahead for the end of packet is present. If not, a state 310 may read more data and return to the decision state 308. If a look-ahead for an end of packet is present, a state 312 may generate the signal ADDR_REQ(@SYSCLK). Next, a state 314 may fetch a queue address from the pipeline and send the queue address to the controllers 118a–118n.

Referring back to the decision state 306, if a previous queue address does not belong to the device, the decision state 316 may determine if the signal ADDR_REQ (@SYSCLK) is detected at the pins. If the signal is not detected at the pins, a state 318 may wait a predetermined amount of time and then the method 300 may return to the decision state 316. If the signal is detected at the pins, the method 300 may move to the state 314.

Each device 106a–106n may have a unique device ID. The device ID may be compared with a number of bits of the queue address to decide whether the address belongs to the same device or not. For example, first, a valid queue address is detected, and then the address is passed through a variable stage pipeline, for the queue address. An exemplary description of the flow of the queue address may be described in the cross referenced patent applications. The method 300 may decide when the next queue address is fetched from the pipeline. The method 300 may ensure that the same queue address is sent to the controllers 118a–118n at the same time for processing, thus ensuring synchronization of the devices.

For example, if an ongoing packet read is occurring, the device 102 may wait for the end of the packet transfer, and then generate the signal ADDR_REQ(@SYSCLK). The other devices 106b–106n may listen to the signal ADDR_REQ(@SYSCLK), during the time interval. The signal ADDR_REQ(@SYSCLK) may indicate that the next queue address can be fetched from the pipeline, since the former one has been consumed. Since all the devices 106a–106n may have the same pipeline, and the timing of fetch from the pipeline is known to all devices 106a–106n, synchronization may be achieved. The signals are generally driven to an active state, inactivated, and then tristated. Thus, the present invention may limit the minimum packet size to that of 2 cycles.

The system 100 may next check whether a queue address belongs to the same device 106a–106n. However, the queue address may have to be flushed, if the particular queue 106a–106n is empty. In this case, the information is similarly sent out to all the devices 106a–106n through the signal QUEUE_EMPTY. The internal pipeline may keep the queue information in all the devices 106a–106n until the corresponding packet is fully read. During the packet read, only the particular device 106a–106n, which owns the queue address, may drive the read bus, while the other devices 106a–106n are generally tristated. The packet read occurs until an end of the packet is reached (as indicated by the signal EOP). After which the following packet read occurs from the same or another device, according to the queue address in the pipeline. The queue empty signal QUEUE_EMPTY and address request signal ADDR_REQ (@SYSCLK) may be implemented as indication or control signals that may communicate a status of the devices 106a–106n.

Switching of the multiqueue devices 106a–106n can happen in a next cycle, since the switching is not limited by the present invention. However, switching of the multiqueue devices 106a–106n can be delayed to avoid contention.

Alternatively, the circuit 100 may be implemented with handshaking capabilities. For example, instead of I/O pins, the present invention may define send data request signals and send data acknowledge signals. The present invention may implement request and acknowledge signals similar to a PCI interface. For example, when a particular device is ready to send data, the device may send a data request and an arbiter may decide which device to process, based on the status of all the requests. The circuit 100 may then generate a data acknowledge signal to the corresponding device that may become the bus master. However, the data packets may not be read in the same sequence as the queue addresses provided, unless the arbiter is made very intelligent.

However, bandwidth loss may occur because of handshaking, unless suitable pipelining is employed. The handshaking implementation additionally requires arbiter logic. An external arbitration device may be implemented or arbitration may be obtained in one of the devices 106a–106n, in which case the particular device may require additional pins.

Alternatively, the system 100 may implement an opendrain signal to indicate a request. The opendrain signal may be implemented instead of the signal ADDR_REQ and the signal QUEUE_EMPTY. The opendrain signal may be wired to the devices 106a–106n. The opendrain signal may be implemented to indicate a request for becoming the bus master. For example, while a device is sending a packet data, if the opendrain signal goes active, the signal opendrain may indicate that the particular device (e.g., 106a) may be required to tristate after the completion of the current packet. The bus master may then switch at the end of the packet transfer, and another one of the devices (e.g., 106b–106n) may start sending data packets, until the signal opendrain again goes active.

However, there is a possibility that multiple requests may come when there are more than two devices. The opendrain embodiment of the present invention may not be capable of processing multiple bus master requests. Specifically, multiple bus master requests may happen when small size packets are read.

The present invention may provide method and/or architecture to automatically arbitrate multiqueue FIFO devices for expanded queue addresses and packets of arbitrary size. Additionally, the present invention may provide an out-of-band bus for communication between multiple devices and arbitration. The shared arbitration bus may consist of one or more signals configured to provide arbitration information. The arbitration information may be presented in serial or parallel.

The system 100 may allow the devices 106a–106n to arbitrate in the same order as that of queue address, which can select the devices 106a–106n randomly. The system 100 may not require an external arbiter. The system 100 may allow packets of any random size to be read back-to-back. The system 100 may implement additional signals to allow proper communication between the devices 106a–106n (e.g., ADDR_REQ and QUEUE_EMPTY). The additional signals may be a function of a data size. The additional signals may also have a time interval that may vary according to the size of the packet being processed. the circuit 100 may handle back-to-back reads of any packet size. The system 100 may not implement opendrain pads. The system 100 may not dependent on the latency between queue address and data.

The various signals of the present invention are generally "on" (e.g., a digital HIGH, active, or 1) or "off" (e.g., a digital LOW, non-active, or 0). However, the particular polarities of the on (e.g., asserted) and off (e.g., de-asserted) states of the signals may be adjusted (e.g., reversed) accordingly to meet the design criteria of a particular implementation.

The function performed by the flow diagrams of FIGS. 3 and 4 may be implemented using a conventional general purpose digital computer programmed according to the teachings of the present specification, as will be apparent to those skilled in the relevant art (s). Appropriate software coding can readily be prepared by skilled programmers based on the teachings of the present disclosure, as will also be apparent to those skilled in the relevant art (s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
   a plurality of storage devices each configured to store and present one or more packets of a data stream over one or more first busses, wherein each of said plurality of storage devices operates at a first speed;
   a scheduler circuit configured to determine which of said storage devices transmits the packets of the data stream; and
   a second bus configured to carry look ahead information and synchronize said one or more devices, wherein said second bus operates at a second speed.

2. The apparatus according to claim 1, wherein said first speed comprises an interface clock speed and said second speed comprises a system clock speed.

3. The apparatus according to claim 1, wherein each of said plurality of storage devices comprise a multiqueue FIFO memory.

4. The apparatus according to claim 1, wherein said apparatus is further configured to provide automatic arbitration of said plurality of storage devices.

5. The apparatus according to claim 1, wherein each of said plurality of storage devices comprise a multiqueue FIFO memory configured to provide automatic arbitration.

6. The apparatus according to claim 1, wherein said plurality of storage devices are configured for expanded queue address.

7. The apparatus according to claim 1, wherein said apparatus is further configured to read one or more packets each of an arbitrary size.

8. The apparatus according to claim 1, wherein said second bus comprises an out-of-band bus for providing communication between said plurality of storage devices for arbitration.

9. The apparatus according to claim 1, wherein said second bus is configured to communicate one or more arbitration signals.

10. The apparatus according to claim 9, wherein said one or more arbitration signals comprise serial or parallel information.

11. The apparatus according to claim 1, wherein said apparatus comprises an event driven variable stage pipeline system.

12. The apparatus according to claim 1, wherein said apparatus is configured to arbitrate in a same order as that of one or more queue address, wherein said one or more queue addresses are configured to randomly select at least one of said plurality of storage devices.

13. The apparatus according to claim 1, wherein said second bus is configured to provide communication between said plurality of storage devices, wherein the communication is a function of the packet size.

14. The apparatus according to claim 1, wherein said second bus is configured to change a time interval of the packets according to the size of the packet being processed.

15. The apparatus according to claim 1, wherein said apparatus is configured to be implemented independently of the latency between addressing the queue and retrieving data.

16. The apparatus according to claim 1, wherein each of said plurality of storage devices comprises:
   a clock synchronization circuit configured to synchronize said first and second speeds; and
   a controller circuit configured to interface said second bus and control said storage device.

17. A method for reading one or more packets from a plurality of devices, comprising the steps of:

(A) detecting a queue address; and (B) determining a location of said queue address by (i) reading at least one of said one or more packets if said queue address belongs to a present device of said plurality of devices packets and (ii) waiting for a boundary differential signal if said queue address does not belong to said present device.

18. The method according to claim 17, wherein said boundary differential signal comprises an end of packet indication.

19. The method according to claim 17, further comprising the step:

(C) detecting an end of packet.

20. A method for synchronization across a plurality of storage devices, comprising the steps of:

(A) determining a location of a previous queue address;

(B) looking for an end of packet indication if said previous queue address belongs to a current device of said plurality of devices; and (C) detecting an address request signal, if said previous queue address does not belong to said current device.

* * * * *